US012043031B2

(12) United States Patent
Drexler

(10) Patent No.: US 12,043,031 B2
(45) Date of Patent: Jul. 23, 2024

(54) COMPUTING DEVICE AND METHOD FOR GENERATING A TIMING SIGNAL FOR A PRINTING DEVICE

(71) Applicant: Canon Production Printing Holding B.V., Hh Venlo (NL)

(72) Inventor: Hubert Drexler, Taufkirchen (DE)

(73) Assignee: Canon Production Printing Holding B.V., Hh Venlo (NL)

(*) Notice: Subject to any disclaimer, the term of this patent is extended or adjusted under 35 U.S.C. 154(b) by 187 days.

(21) Appl. No.: 17/577,782

(22) Filed: Jan. 18, 2022

(65) Prior Publication Data

US 2022/0227130 A1 Jul. 21, 2022

(30) Foreign Application Priority Data

Jan. 19, 2021 (DE) ..................... 10 2021 100 962.6

(51) Int. Cl.
*B41J 2/045* (2006.01)
*B41J 11/00* (2006.01)

(52) U.S. Cl.
CPC ....... *B41J 2/04573* (2013.01); *B41J 2/04586* (2013.01)

(58) Field of Classification Search
CPC .................................................... B41J 2/04573
See application file for complete search history.

(56) References Cited

U.S. PATENT DOCUMENTS

| | | | | |
|---|---|---|---|---|
| 7,665,817 | B2 | 2/2010 | Folkins | |
| 9,387,670 | B1 * | 7/2016 | Kelly, III | B41J 2/04573 |
| 10,406,840 | B2 | 9/2019 | Zollner et al. | |
| 2012/0219342 | A1 | 8/2012 | Peter | |
| 2018/0104951 | A1 * | 4/2018 | Kaburagi | B41J 2/04573 |
| 2018/0207961 | A1 * | 7/2018 | Mori | B41J 13/0009 |
| 2019/0009530 | A1 * | 1/2019 | Sakuyama | B41J 2/04573 |

FOREIGN PATENT DOCUMENTS

DE 102017114470 A1 1/2019

OTHER PUBLICATIONS

German Search Report dated Sep. 24, 2021, Application No. 10 2021100 962.6.

* cited by examiner

*Primary Examiner* — Shelby L Fidler
(74) *Attorney, Agent, or Firm* — The Webb Law Firm

(57) ABSTRACT

A computing device for a printing device may include a first transducer for generating a first clock frequency and a second transducer for generating a second clock frequency. The computing device may determine the timing signal for clocking the printing operation of the printing device on the basis of the first clock frequency and/or on the basis of the second clock frequency, in particular to increase the uniformity of the timing signal and/or in order to enable a dynamic adaptation of the timing signal to a changing property of the printing device and/or of the recording medium to be printed to.

15 Claims, 4 Drawing Sheets

COMPUTING DEVICE AND METHOD FOR GENERATING A TIMING SIGNAL FOR A PRINTING DEVICE

CROSS REFERENCE TO RELATED APPLICATIONS

This patent application claims priority to German Patent Application No. 102021100962.6, filed Jan. 19, 2021, which is incorporated herein by reference in its entirety.

BACKGROUND

Field

The disclosure relates to a computing device (controller) and a corresponding method for generating a timing signal, in particular a line timing, for a printing device for printing to a recording medium in the form of a belt or web.

Related Art

Printing devices, for example inkjet printing devices, may be used for printing to recording media in the form of a web, for example paper. For this purpose, one or more print heads having respectively one or more nozzles are used in order to fire ink droplets onto the recording medium and in order to thus generate a desired print image on the recording medium. During the printing operation, the recording medium is moved past the one or more print heads with a transport velocity so that the print image may be printed line by line on said recording medium.

The activation of the one or more print heads for printing the different lines of a print image typically takes place depending on a timing signal, in particular depending on a line timing, that depends on the transport velocity of the recording medium. The timing signal may be generated by a transducer, in particular using an encoder, which is driven by the recording medium.

The timing signal generated by the transducer may exhibit statistical fluctuations that may lead to corresponding statistical fluctuations of the line pitch/spacing between adjacent lines of a print image, and possibly to a negative effect on the print quality. The timing signal generated by the transducer may also for the most part not be flexibly adapted to changing print conditions, for example a change in the thickness and/or the shrinking behavior of the recording medium to be printed to.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
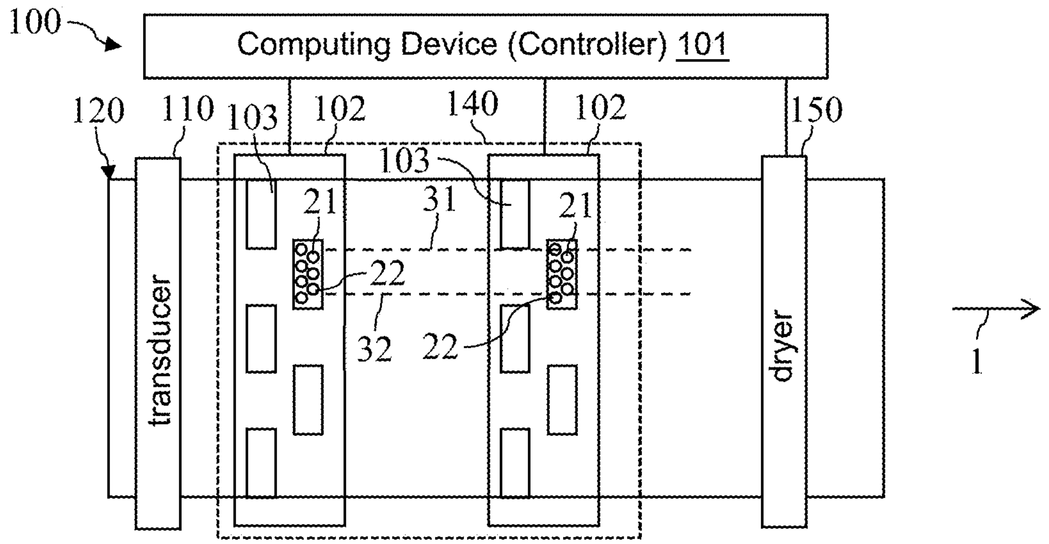

FIG. 1 a block diagram of an inkjet printer according to an exemplary embodiment.

Figure 2:
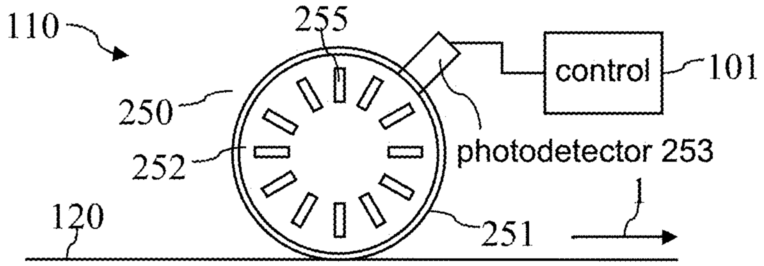

FIG. 2 a transducer according to an exemplary embodiment.

Figure 3A:
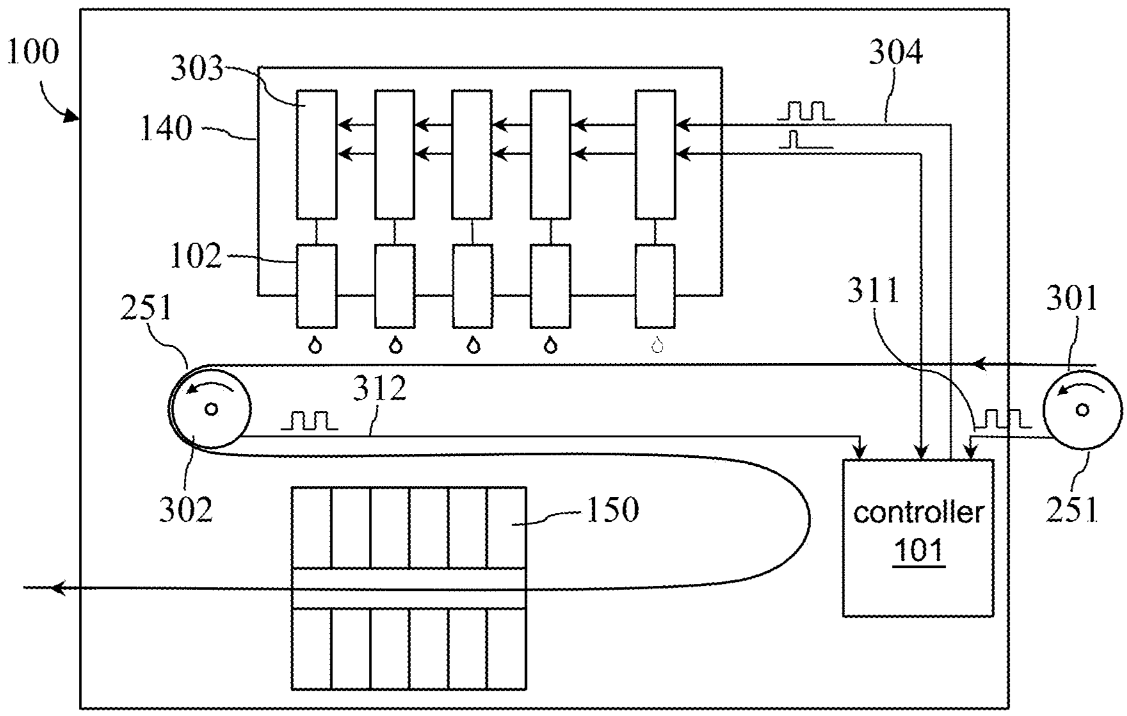

FIG. 3*a* a printer having a plurality of transducers according to an exemplary embodiment.

Figure 3B:
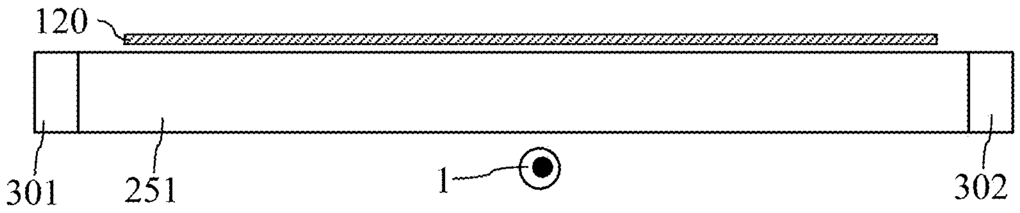

FIG. 3*b* a roller having two transducers according to an exemplary embodiment.

Figure 4:
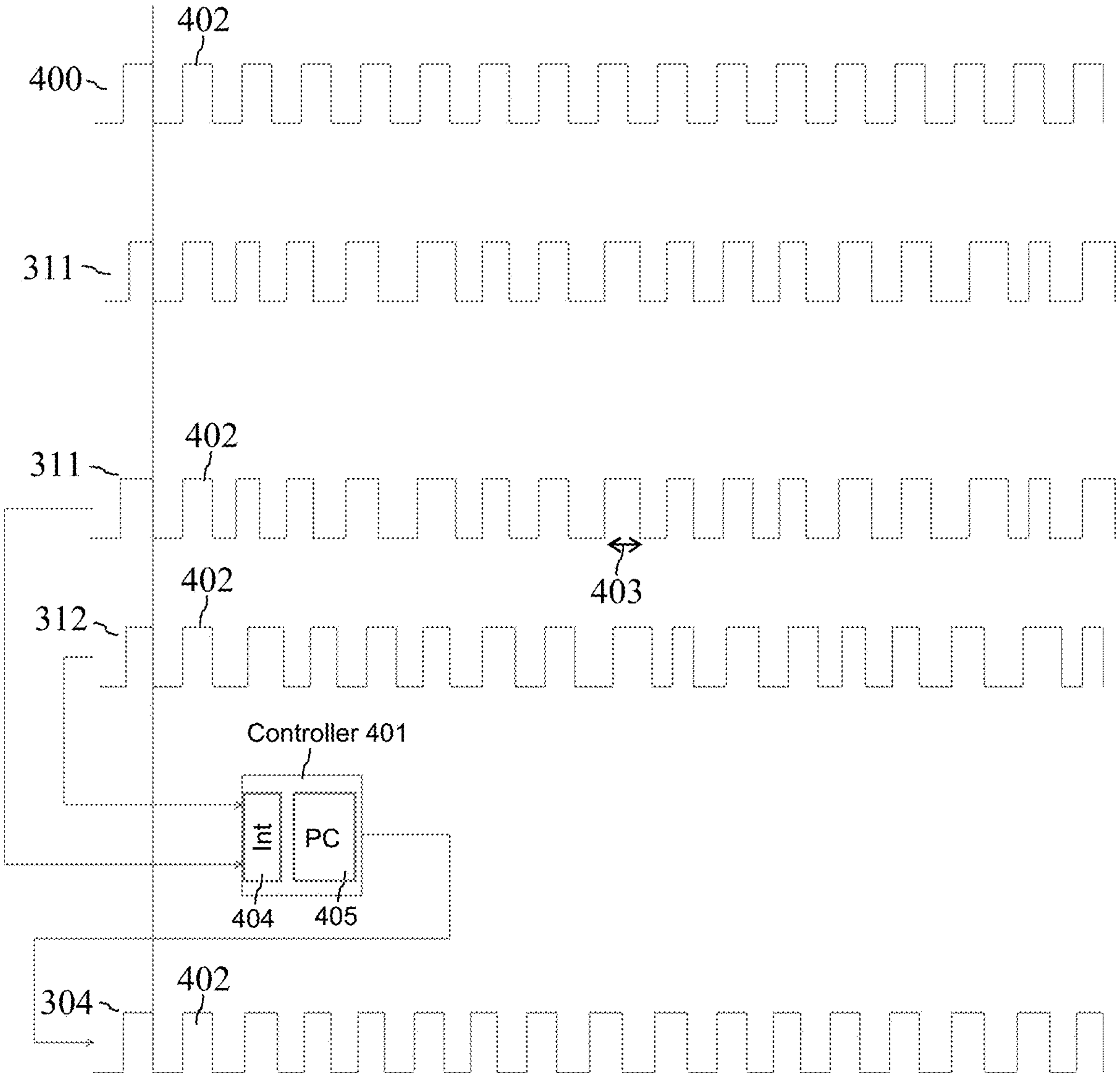

FIG. 4 a plot of timing signals according to an exemplary embodiment.

Figure 5:
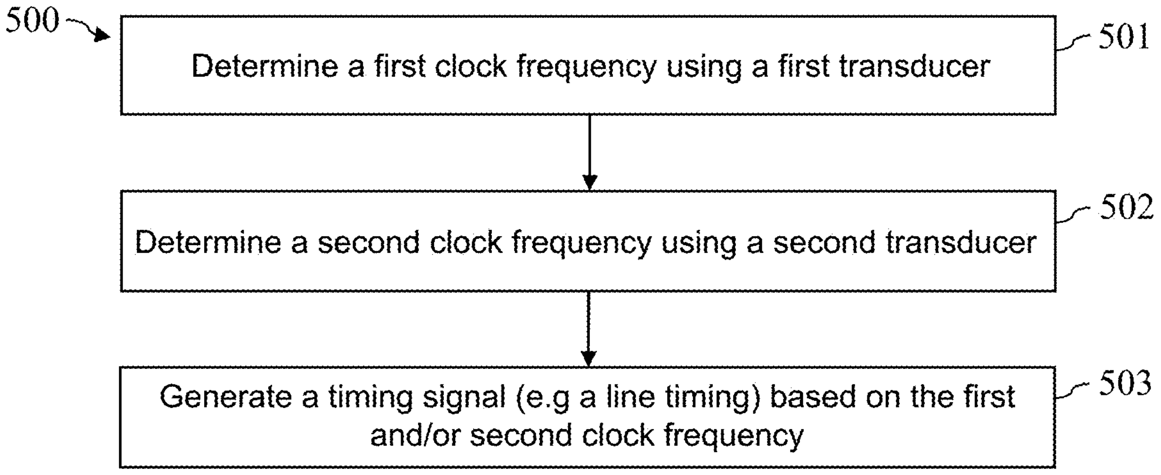

FIG. 5 a flowchart of a method for generating a timing signal for a printer.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to enable a precise and/or flexible generation of a timing signal for a printing device.

According to one aspect of the disclosure, a computing device (controller) for determining a timing signal for a printing device is described, wherein the printing device is designed to print to a recording medium in the form of a web or sheet. The computing device is configured to determine a first clock frequency that is generated by a first transducer driven by the recording medium or its transport device, for example a transport belt, as well as a second clock frequency that is generated by a second transducer driven by the recording medium or its transport device, for example a transport belt. Furthermore, the computing device is configured to generate the timing signal on the basis of the first clock frequency and/or on the basis of the second clock frequency.

According to a further aspect of the disclosure, a method is described for determining a timing signal for a printing device, wherein the printing device is designed to print to a recording medium in the form of a web or sheet. The method includes the determination of a first clock frequency that is generated by a first transducer driven by the recording medium or its transport device, for example a transport belt, as well as the determination of a second clock frequency that is generated by a second transducer driven by the recording medium or its transport device, for example a transport belt. Furthermore, the method includes the generation of the timing signal on the basis of the first clock frequency and/or on the basis of the second clock frequency.

The printing device (printer) 100 depicted in FIG. 1*a* is designed for printing to a recording medium 120 in the form of a belt or web or sheet. The printing device 100 may be designed to take the recording medium 120 in the form of a web off of a roll. The recording medium 120 may be manufactured from paper, paperboard, cardboard, metal, plastic, textiles, a combination thereof, and/or other materials that are suitable and can be printed to. The recording medium 120 is transported along the transport direction 1 (represented by an arrow) through the print group 140 of the printing device 100.

In the depicted example, the print group 140 of the printing device 100 comprises two print bars 102, wherein each print bar 102 may be used for printing with ink of a defined color, for example black, cyan, magenta, and/or yellow, and if applicable MICR ink. Furthermore, the printing device 100 typically comprises at least one dryer or fixer 150 that is configured to fix a print image printed onto the recording medium 120.

A print bar 102 may comprise one or more print heads 103 that are possibly arranged side by side in a plurality of rows in order to print the dots of different columns 31, 32 of a print image onto the recording medium 120. In the example depicted in FIG. 1, a print bar 102 comprises five print heads 103, wherein each print head 103 prints the dots of a group of columns 31, 32 of a print image onto the recording medium 120.

In the embodiment depicted in FIG. 1, each print head 103 of the print group 140 comprises a plurality of nozzles 21, 22, wherein each nozzle 21, 22 is configured to fire or eject ink droplets onto the recording medium 120. A print head 103 of the print group 140 may, for example, comprise multiple thousands of effectively utilized nozzles 21, 22 that are arranged along a plurality of rows transverse to the transport direction 1 of the recording medium 120. By means of the nozzles 21, 22 of a print head 103 of the print group 140, dots of a line of a print image may be printed onto the recording medium 120 transverse to the transport direction 1, meaning along the width of the recording medium 120.

The printing device 100 also comprises a controller 101, for example an activation hardware and/or a processor that is configured to activate the actuators of the individual nozzles 21, 22 of the individual print heads 103 of the print group 140 in order to apply the print image onto the recording medium 120 depending on print data. The print data may respectively indicate whether an ink ejection should take place or not, and if applicable what ink quantity should be ejected, for each nozzle 21, 22, i.e. for each column 31, 32 of the print image, and for each line of the print image. In an exemplary embodiment, the controller 101/401 includes processing circuitry 405 (FIG. 4) that is configured to perform one or more functions and/or operations of the controller 101/401, including activating the actuators of the individual nozzles 21, 22 of the individual print heads 103 of the print group 140 to apply the print image onto the recording medium 120 based on print data, processing print and/or other data, and/or controlling one or more operations of the printing device 100. In an exemplary embodiment, the controller 101/401 includes an interface 404 (e.g. a wired and/or wireless input and/or output interface, transceiver, or the like) that is configured to receive or output data or information. For example, the controller 101/401 may receive signals generated by one or more components of the printer 100 (e.g. one or more transducers 110). In an exemplary embodiment, the controller 101/401 includes a memory configured to store data/information, and/or store executable code that is executable by the processing circuitry 405.

The print group 140 of the printing device 100 thus comprises at least one print bar 102 with K nozzles 21, 22 that may be activated with a defined line timing signal in order to print a line with K pixels or K columns 31, 32—for example with K>1000—of a print image onto the recording medium 120, said line traveling transverse to the transport direction 1 of the recording medium 120. In the depicted example, the nozzles 21, 22 are installed immobile or fixed in the printing device 100, and the recording medium 120 is directed past the stationary nozzles 21, 22 and/or the print heads 103 with a defined transport velocity.

In an exemplary embodiment, the printing device 100 also comprises a rotary encoder (a transducer, for short) 110 that is configured to provide a clock frequency or a clock frequency signal for determining the line timing or the line signal for the activation of the nozzles 21, 22 of the printing device 100. The transducer 110 may also referred to as an encoder. As depicted in FIG. 2, the transducer 110 may be arranged at and/or be attached to a rotating roller that is driven by the recording medium 120 moving in the transport direction 1, or by its transport device (transport belt), and that moves with the recording medium 120, in particular without slippage. One revolution of the rotating roller 251 thus corresponds to a defined travel d of the recording medium 120. The distance traveled by the recording medium 120 given one revolution of the rotating roller 251 may thereby depend on the thickness of the recording medium 120 radial to the rotating roller 251, and/or on the shrinkage or expansion behavior of the recording medium 120 within the scope of the printing operation.

The rotary encoder 110 may comprise at least one rotary encoder 251 that moves together with the rotating roller 251 and that, for example, has a disc 252 provided with slits 255 that is located between at least one light emitting diode and at least one photodetector 253. Preferably, two photodetectors 253 arranged slightly offset are present that emit two signals A and B that are electrically phase-shifted, preferably by 90°, and preferably rectangular. From these two signals, an AB counter can determine the rotation direction of the disc 252 and count the edge changes of the electrical signals of the photodetectors 253. In total, up to four clock pulses may thus be generated per slit 255, which clock pulses may for example, be referred to as clock frequency pulses. A sequence of clock frequency pulses may thus be generated by a rotary encoder 110. The pitch between two adjacent clock frequency pulses thereby corresponds to a defined traveled clock frequency distance $d_g$ of the recording medium 120. A sequence of clock frequency pulses may consequently be generated by the exemplary transducer 110 per revolution of the rotating roller 251. The sequence of clock frequency pulses may be referred to as a clock frequency signal or as a clock frequency.

The number of lines that is printed on a defined travel of the recording medium 120 in the transport direction 1 depends on the dot resolution in the transport direction 1. Depending on the dot resolution, a line signal or a line timing with a sequence of line timing pulses may be generated on the basis of the sequence of clock frequency pulses, such that the distance between two line timing pulses corresponds to the line pitch predetermined by the dot resolution.

The transducer 110 thus enables a line signal depending on the transport velocity or a line timing depending on the transport velocity to be generated. This enables an undistorted print image to be printed onto the recording medium 120 even given variable transport velocity, for example given reduction of the transport velocity in preparation for a printing pause, or given increase of the transport velocity following a printing pause.

The line timing for a printing device 100 may in particular be generated by means of a transducer 110 attached to a deflection roller 251. The transport velocity of the recording medium 120 as measured by the transducer 110, and thus the number of clock pulses per length, are thereby typically dependent on the diameter of the roller 251 and/or on the thickness or gauge of the recording medium 120. The rotating roller 251 at which the transducer 110 is arranged may have manufacturing tolerances. The printing device 100 may also be designed to print to recording media 120 of different thicknesses.

In an exemplary embodiment, the printing device 100 may have a computing device, in particular as part of the controller 101, which is configured to consider one or more variable boundary conditions or properties of the printing device 100 and/or of the recording medium 120 in the determination of the line timing and/or in the determination of the clock frequency. In particular, the following one or more properties may be considered:

- the actual diameter of the rotating roller 251, in order to compensate for manufacturing tolerances of said rotating roller 251;
- the actual thickness of the recording medium 120 to be printed to, in order to be able to print to recording media 120 of different thicknesses; and/or
- the actual extent of the shrinkage of the recording medium 120 within the printing device 100, for example due to the concluding drying of the recording medium 120.

The one or more properties of the printing device 100 and/or of the recording medium 120 may be considered as parameter values in the determination of the line timing and/or of the clock frequency of the transducer 110.

It may possibly be necessary to adapt one or more boundary conditions or properties during the running printing operation of the printing device 100, for example because of a retooling for a recording medium 120 of different thickness during the printing operation. This is typically not possible since the transducer 110 typically generates no clock frequency during the reprogramming, i.e. during the change of a parameter value of a property. A change of the parameter values of the one or more properties may thus typically only be performed during a standstill of the printing device 100, and thus not during the printing operation of the printing device 100.

During the running printing operation, a dynamic adaptation of the shrinkage compensation is thus typically possible if the shrinkage of the recording medium 120 varies during the printing operation. Dynamic adaptations of the setting of the thickness of the recording medium 120, and/or a change between recording media 120 of different thicknesses or gauges, are also typically not possible without interrupting the printing operation. It is also typically not possible to react to manufacturing-dependent fluctuations in the thickness of the recording medium 120 without interrupting the printing operation.

The clock frequency generated by the transducer 110 may also exhibit statistic fluctuations. The timing synchronization may thereby be constant, on average, over one revolution of the rotating roller 251. On the other hand, however, the time interval between the individual clock frequency pulses may fluctuate statistically, which may lead to negative effects on the print quality given complex print images.

FIG. 3*a* shows a printing device 100 that has a plurality of transducers 301, 302, 110. In the example depicted in FIG. 3*a*, a first transducer 301 is arranged at a first roller 251, approximately at the input of the print group 140, and a second transducer 302 is arranged at a second roller 251, approximately at the output of the print group 140. Alternatively or additionally, two transducers 301, 302 may be arranged at different, opposite ends of a single rotating roller 251, as depicted in FIG. 3*b*.

The first transducer 301 may be configured to generate a first clock frequency 311, and the second transducer 302 may be configured to generate a second clock frequency 312. The first and second clock frequency 311, 312 may be provided to a computing device, for example as part of the controller 101 of the printing device 100. The computing device (controller 101) may be configured to generate a timing signal 304, in particular a line timing, on the basis of the first and second clock frequency 311, 312. The timing signal 304, in particular the line timing, may be used in the individual controllers 303 for timing of the individual print bars 102 of the printing device 100 during the printing operation of said printing device 100.

FIG. 4 shows an example of a first clock frequency 311 and an example of a second clock frequency 312 that respectively have a sequence of clock frequency pulses 402. As is clear from FIG. 4, the chronological length 403 of the clock frequency pulses 402 of the clock frequencies 311, 312 respectively exhibits statistical fluctuations. In particular, the clock frequencies 311, 312 respectively deviate from an ideal timing 400 with a sequence of uniform and/or identical timing pulses 402.

In an exemplary embodiment, the computing device 401 may be configured to determine a timing signal 304 with a sequence of timing signal pulses 402 on the basis of the clock frequency 311, 312. The timing signal 304 may thereby be determined such that the extent of statistical fluctuations of the timing signal pulses 402, in particular the extent of statistical fluctuations of the chronological length 403 of the timing pulses 402, of the timing signal 304 is less than the corresponding extent of statistical fluctuations of the clock frequency pulses 402 of the clock frequencies 311, 312. For example, this may be achieved via an averaging and/or via another manner of combination of the corresponding clock frequency pulses 402 of the clock frequencies 311, 312 to determine the corresponding timing signal pulses 402 of the timing signal 304.

A timing signal 304 with an increased quality, in particular with an increased uniformity, may thus be provided, whereby the print quality of the printing device 100 may be increased.

In an exemplary embodiment, alternatively or additionally, the controller 101 of the printing device 100 may be configured to use the clock frequencies 311, 312 individually for generation of the timing signal 304, in particular in order to enable a dynamic changing of a boundary condition for the generation of the timing signal 304 during the printing operation. In particular, the controller 101 may be configured to detect that at least one boundary condition should be changed, in particular at least one property of the printing device 100 and/or of the recording medium 120. In reaction to this, it may be effected that the timing signal 304 is generated on the basis of the first clock frequency 311 but not on the basis of the second clock frequency 312. A reprogramming of the second transducer 302 may thereupon be implemented without the generation of the timing signal 304 thereby being significantly negatively affected.

After reprogramming of the second transducer 302, as soon as the change to the boundary condition or property is effective in the second clock frequency 312, it may be effected that the timing signal 304 is generated on the basis of said second clock frequency 312 and not on the basis of the first clock frequency 311. A reprogramming of the first transducer 301 may also be performed. Following this, the timing signal 304 may then again be generated with increased quality on the basis of the first and second clock frequency 311, 312.

Two structurally identical encoders 301, 302, one at each end of a shaft, may thus possibly be attached to the transducer roller 251. The clock frequencies 311, 312 of the two transducers 301, 302 may be used for different purposes. A timing signal 304 with an increased uniformity may be generated by superimposing the two clock frequencies 311, 312, in order to increase the print quality of the printing device 100.

In an exemplary embodiment, alternatively or additionally, a dynamic adaptation of a property—for example the shrinking and/or the thickness—of the recording medium 120 may be enabled. For this purpose, a transition to only one active transducer 301, a subsequent reprogramming of the second transducer 302, a switching to said second transducer 302, and a reprogramming of the first transducer 301 may be effected. Finally, both transducer 301, 302 may again be actively used to generate the timing signal 304.

FIG. 5 shows a workflow diagram (flowchart) of an example of a, possibly computer-implemented, method 500 for determining a timing signal 304 for a printing device 100. The printing device 100 may be configured to print to a recording medium 120 in form of a web or sheet. The timing signal 304 may be used to clock the printing of the recording medium 120. In particular, the line timing may be generated for the printing of successive lines of a print image onto the recording medium 120 depending on the timing signal 304.

In an exemplary embodiment, the method 500 includes the determination 501 of a first clock frequency 311 that is generated by a first transducer 301 driven by the recording medium or its transport device 120, for example a transport belt. Furthermore, the method 500 includes the determination 502 of a second clock frequency 312 that is generated by a second transducer 302, 110 of the printing device 100, said second transducer 302, 110 being driven by the recording medium or its transport device 120, for example a transport belt. The transducer 301, 302 may thereby be driven indirectly by the recording medium 120 via at least one rotating roller 251 of the printing device 100, wherein the rotating roller 251 is designed to roll, in particular without slippage, on the recording medium 120 moving with a transport velocity. The first clock frequency 311 and the second clock frequency 312 respectively comprise a sequence of clock frequency pulses 402, for example as described in conjunction with FIGS. 2 and 4.

Furthermore, the method 500 includes the generation 503 of the timing signal 304 on the basis of the first clock frequency 311 and/or on the basis of the second clock frequency 312. In particular, the timing signal 304 may be determined on the basis of both clock frequencies 311, 312 in order to increase the uniformity of the timing signal 304. Alternatively, the timing signal 304 may be selectively generated on the basis of the first clock frequency 311 or on the basis of the second clock frequency 312, for example in order to produce a dynamic alteration of a property of the printing device 100 and/or of the recording medium 120 in the generation of the clock frequencies 311, 312 and/or of the timing signal 304. The print quality and/or the flexibility of the printing device 100 may thus be increased.

In this document, a computing device 401, 101 is also described for determining a timing signal 304 for a printing device 100. The computing device 101 may, for example, comprise one or more FPGAs (Field Programmable Gate Arrays) or be implemented in an FPGA. The printing device 100 may be designed to print to a recording medium 120 in the form of a web or sheet, wherein the recording medium 120 may be transported with a defined transport velocity through a print group 140 of the printing device 100 during the printing operation in order to print to the recording medium 120.

In an exemplary embodiment, the computing device 401, 101 may be configured to determine a first clock frequency 311 that is generated by a first transducer 301, 110 of the printing device 100, said first transducer 301, 110 being driven by the recording medium or its transport device (for example a transport belt) 120. The first transducer 301 and the second transducer 302 may be structurally identical. The first transducer 301 and the second transducer 302 may also be designed to generate a first clock frequency 311 or, respectively, a second clock frequency 312 that respectively comprise a sequence of clock frequency pulses 402. The number of clock frequency pulses 402 in the first and second clock frequency 311, 312 may thereby be identical. The duration of the sequence of clock frequency pulses 402 for one complete revolution of the first transducer 301 and the second transducer 302 may also be identical. On the other hand, the position and/or the chronological length 403 of the clock frequency pulses 402 in the first and second clock frequency 311, 312 may differ from one another.

The first transducer 301 and the second transducer 302 may respectively be arranged at a rotating roller 251 that is driven by the recording medium or its transport device 120, for example a transport belt. In one embodiment variant, the first transducer 301 and the second transducer 302 may be arranged at different rotating rollers 251 of the printing device 100. For example, the first transducer 301 may be arranged at a rotating roller 251 at the input of the print group 140 of the printing device 100, and the second transducer 302 may be arranged at a rotating roller 251 at the output of the print group 140 of the printing device 100. An especially robust timing signal 304 may be generated via the use of different rotating rollers 251 for the different transducer 301, 302.

Alternatively, the first transducer 301 and the second transducer 302 may be arranged at different ends of the same rotating roller 251 of the printing device 100. An especially uniform timing signal 304 may thus be generated.

In an exemplary embodiment, the computing device (controller) 401, 101 may also be configured to generate the timing signal 304 on the basis of the first clock frequency 311 and/or on the basis of the second clock frequency 312. A combination of the first clock frequency 311 and the second clock frequency 312 may thereby take place in order to increase the quality, in particular the temporal uniformity, of the timing signal 304. Alternatively, the two clock frequencies 311, 312 may be used for a flexible alteration of a property of the printing device 100 and/or of the recording medium 120 during the printing operation, said property being relevant to the timing signal 304.

A computing device 401 for a printing device 100 is thus described, wherein the printing device 100 comprises a first transducer 301 to generate a first clock frequency 311 and a second transducer 302 to generate a second clock frequency 312. The computing device 401 is configured to determine the timing signal 304 for timing the printing operation of the printing device 100 on the basis of the first clock frequency 311 and/or on the basis of the second clock frequency 312, in particular in order to increase the uniformity of the timing signal 304 and/or in order to enable a dynamic adaptation of the timing signal 304, possibly during the printing operation, to a changing property of the printing device 100 and/or of the recording medium 120 to be printed to.

The computing device 401, 101 may be configured to determine, on the basis of the timing signal 304, a line timing that indicates the time interval for printing of directly successive lines of a print image onto the recording medium 120. The timing signal 304 may thereby be a whole-number multiple of the line timing. The whole-number factor between line timing and timing signal 304 may depend on the dot resolution of the print image in the transport direction 1 of the recording medium 120. The printing operation of the printing device 100, in particular the printing operation of the one or more print heads 103, may then be controlled depending on the line timing.

The computing device 401 may be configured to generate, on the basis of the first clock frequency 311 and on the basis of the second clock frequency 312, a timing signal 304 that respectively comprises precisely one corresponding timing signal pulse 402 for every clock frequency pulse 402. The computing device 401 may in particular be configured to determine the timing signal 304 such that the extent of temporal fluctuations of the sequence of timing signal pulses 402 is less, in particular averaged over time, than the corresponding extent of temporal fluctuations of the sequence of clock frequency pulses 402 of the first clock frequency 311 and/or of the second clock frequency 312. The print quality of the printing device 100 may thus be increased. In particular, the precision of the placement of lines of a print image on the recording medium 120 may thus be increased.

The computing device 401 may be configured to induce the first transducer 301 to generate the first clock frequency 311, and/or to induce the second transducer 302 to generate the second clock frequency 312, depending on parameter values for one or more properties of the printing device 100 and/or of the recording medium 120. In other words, respective parameter values of one or more properties of the printing device 100 and/or of the recording medium 120 may be taken into account in the generation of the clock frequencies 311, 312.

The one or more properties of the printing device 100 and/or of the recording medium 120 may include: the diameter of the one or more rotating rollers 251 driven by the recording medium 120, at which one or more rotating rollers 251 are arranged the first transducer 301, 110 and/or the second transducer 302, 110; the thickness of the recording medium 120 to be printed to; and/or the shrinkage or expansion behavior of the recording medium 120 during the printing operation of the printing device 100.

An especially precise timing signal 304 may be generated by taking into account parameter values for one or more properties of the printing device 100 and/or of the recording medium 120.

The computing device 401, 101 may be configured to determine that the parameter value of at least one property of the printing device 100 and/or of the recording medium 120 should be changed from a previous parameter value to a new parameter value during the printing operation of the printing device 100. For example, a recording medium 120 of different thickness may be changed to during the printing operation.

In reaction to this, it may be effected that the timing signal 304 is generated on the basis, in particular only on the basis, of the first clock frequency 311 that is generated by the first transducer 301 using the previous parameter value, and that the timing signal 304 is not generated on the basis of the second clock frequency 312. Furthermore, it may be effected that the second transducer 302 generates the second clock frequency 312 using the new parameter value. As a result of thus, the two clock frequencies 311, 312 deviate from one another, in particular even averaged over time. The second transducer 302 may thereby be used to prepare the change of the parameter value of the at least one property of the printing device 100 and/or of the recording medium 120.

The computing device 401, 101 may also be configured to have the effect, at the change point in time at which the parameter value of the at least one property of the printing device 10 and/or of the recording medium 120 is changed from the previous parameter value to the new parameter value, that the timing signal 304 is generated on the basis, possibly solely on the basis, of the second clock frequency 312 that is generated by the second transducer 302 using the new parameter value, and that the timing signal 304 is not generated on the basis of the first clock frequency 311. A reliable changing of the parameter value of the at least one property of the printing device 100 and/or of the recording medium 120 may thus be effected.

Furthermore, the computing device 401, 101 may be configured to have the effect, at or after the change point in time, that the first transducer 301 generates the first clock frequency 311 using the new parameter value. Following this, the timing signal 304 may also be generated on the basis of the first clock frequency 311 and on the basis of the second clock frequency 312 in order to produce an increased precision and/or uniformity of the timing signal 304.

Furthermore, in this document a printing device 100 is described that comprises the computing device 401 described in this document.

Via the measures described in this document, the quality, in particular the temporal uniformity, of the line timing of a printing device 100 may be increased, which enables an increase in the print quality of the printing device 100, in particular given printing with multiple colors. A flexible adaptation of the printing conditions, in particular with respect to one or more properties of the recording medium 120 to be printed to, during the running printing operation is also enabled via the measures described in this document.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 transport direction
21, 22 nozzle
31, 32 column (of a print image)
100 printing device
101 controller
102 print bar
103 print head
110 transducer/encoder
120 recording medium
140 print group
150 dryer or fixer
250 rotary encoder
251 rotating roller/deflection roller
252 disc
253 photodetector
254 light emitting diode
255 slit
301, 302 transducer
303 print bar controller
304 timing signal
311, 312 clock frequency
400 ideal timing
401 computing device (controller)
402 timing pulse (clock frequency pulse, timing signal pulse)
403 chronological length (timing pulse)
404 interface
405 processing circuitry
500 method for determining a timing signal
501-503 method operations

The invention claimed is:

1. A computing device for determining a timing signal for a printer configured to print to a recording medium, the computing device comprising:

an interface; and processing circuitry that is configured to:

determine a first clock frequency based on a signal received via the interface from a first transducer driven by the recording medium or a transport device configured to drive the recording medium;

determine a second clock frequency based on a signal received via the interface from a second transducer driven by the recording medium or the transport device, wherein the first clock frequency and the second clock frequency respectively comprise a sequence of clock frequency pulses; and generate the timing signal based on the first clock frequency and the second clock frequency, wherein the processing circuitry is configured to generate the timing signal based on the first clock frequency and the second clock frequency, the timing signal respectively comprising precisely one corresponding timing signal pulse for each clock frequency pulse of the first clock frequency and the second clock frequency, wherein the processing circuitry is configured to determine the timing signal such that an extent of temporal fluctuations of the sequence of timing signal pulses is less than a corresponding extent of temporal fluctuations of clock frequency pulses of the first clock frequency and of the second clock frequency which is achieved via an averaging and/or via another manner of combination of the first clock frequency pulse and of the second clock frequency pulse, and wherein the processing circuitry is configured to, based on parameter values for one or more properties of the printer and/or of the recording medium: induce the first transducer to generate the first clock frequency, and induce the second transducer to generate the second clock frequency.

2. The computing device according to claim 1, wherein the one or more properties include:

a diameter of a rotating roller driven by the recording medium or the transport device, the rotating roller being arranged at the first transducer and/or at the second transducer;

a thickness of the recording medium; and/or a shrinkage or expansion behavior of the recording medium during a printing operation of the printer.

3. The computing device according to claim 1, wherein the processing circuitry is configured to:

determine whether to modify the parameter value of at least one of the properties of the printer and/or of the recording medium from a previous parameter value to a new parameter value during the printing operation of the printing device; and in response to the parameter value being modified:

the timing signal being generated based on the first clock frequency generated by the first transducer using the previous parameter value;

the timing signal not being generated based on the second clock frequency; and the second transducer generating the second clock frequency using the new parameter value.

4. The computing device according to claim 3, wherein the processing circuitry is configured to, at a change point in time at which the parameter value of the at least one property of the printing device and/or of the recording medium is changed from the previous parameter value to the new parameter value, generate the timing signal based on the second clock frequency generated by the second transducer using the new parameter value, the timing signal not being generated based on the first clock frequency.

5. The computing device according to claim 4, wherein the processing circuitry is configured to, at or after the change point in time:

cause the first transducer generates the first clock frequency using the new parameter value; and following this, generate the timing signal based on the first clock frequency and the second clock frequency.

6. The computing device according to claim 1, wherein the processing circuitry is configured to determine a line timing based on the timing signal, the line timing being indicative of a time interval for the printing of directly successive lines of a print image on the recording medium.

7. The computing device according to claim 6, wherein the timing signal is a whole-number multiple of the line timing.

8. The computing device according to claim 1, wherein the first transducer and the second transducer are structurally identical.

9. The computing device according to claim 1, wherein the first transducer and the second transducer are respectively arranged at a rotating roller of the printer that is driven by the recording medium.

10. The computing device according to claim 1, wherein the first transducer and the second transducer are arranged at different rotating rollers of the printer.

11. The computing device according to claim 10, wherein the first transducer and the second transducer are arranged at a rotating roller at an input of a print group of the printer and at a rotating roller at an output of the print group of the printer.

12. The computing device according to claim 1, wherein the first transducer and the second transducer are arranged at different ends of a same rotating roller of the printer.

13. The computing device according to claim 1, wherein the recording medium is a web or sheet.

14. A method for determining a timing signal for a printer configured to print to a recording medium, the method comprising:

determining a first clock frequency generated by a first transducer driven by the recording medium;

determining a second clock frequency generated by a second transducer driven by the recording medium, wherein the first clock frequency and the second clock frequency respectively comprise a sequence of clock frequency pulses; and generating the timing signal based on the first clock frequency and the second clock frequency, wherein the timing signal is generated based on the first clock frequency and the second clock frequency, the timing signal respectively comprising precisely one corresponding timing signal pulse for each clock frequency pulse of the first clock frequency and the second clock frequency, wherein the timing signal is determined such that an extent of temporal fluctuations of the sequence of timing signal pulses is less than a corresponding extent of temporal fluctuations of clock frequency pulses of the first clock frequency and of the second clock frequency which is achieved via an averaging and/or via another manner of combination of the first clock frequency pulse and of the second clock frequency pulse, and wherein, based on parameter values for one or more properties of the printer and/or of the recording medium, the first transducer is induced to generate the first clock frequency, and the second transducer is induced to generate the second clock frequency.

15. A non-transitory computer-readable storage medium with an executable program stored thereon, that when executed, instructs a processor to perform the method of claim 14.

* * * * *